(12) United States Patent
Yao et al.

(10) Patent No.: US 7,765,679 B2
(45) Date of Patent: Aug. 3, 2010

(54) METHOD OF MANUFACTURING A FLOW RATE SENSOR

(75) Inventors: Yahong Yao, Milpitas, CA (US);
Chih-Chang Chen, Cupertino, CA (US);
Gafeng Wang, San Jose, CA (US); Liji Huang, San Jose, CA (US)

(73) Assignee: Siargo, Inc., Santa Clara, CA (US)

( * ) Notice: Subject to any disclaimer, the term of this patent is extended or adjusted under 35 U.S.C. 154(b) by 148 days.

(21) Appl. No.: 11/523,436

(22) Filed: Sep. 19, 2006

(65) Prior Publication Data
US 2007/0011867 A1    Jan. 18, 2007

Related U.S. Application Data

(62) Division of application No. 10/799,071, filed on Mar. 11, 2004, now abandoned.

(51) Int. Cl.
*H05B 3/00* (2006.01)
(52) U.S. Cl. .......................... 29/611; 29/610.1; 29/825; 29/829; 29/846; 73/204.23; 73/204.25; 73/204.26; 216/16
(58) Field of Classification Search ............... 29/611, 29/610.1, 825, 829, 846, 847; 73/204.23, 73/204.25, 204.26; 216/16
See application file for complete search history.

(56) References Cited

U.S. PATENT DOCUMENTS

| | | | | |
|---|---|---|---|---|
| 5,237,867 A * | 8/1993 | Cook, Jr. | ............... | 73/204.15 |
| 6,526,823 B2 * | 3/2003 | Tai et al. | ............... | 73/204.26 |
| 6,983,653 B2 * | 1/2006 | Iwaki et al. | ............... | 73/204.23 |

\* cited by examiner

*Primary Examiner*—Thiem Phan
(74) *Attorney, Agent, or Firm*—Bo-In Lin

(57) ABSTRACT

A mass flow sensor is manufactured by a process of carrying out a micro-machining process on an N or lightly doped P-type silicon substrate with orientation <100>. This mass flow sensor comprises a central thin-film heater and a pair of thin-film heat sensing elements, and a thermally isolated membrane for supporting the heater and the sensors out of contact with the substrate base. The mass flow sensor is arranged for integration on a same silicon substrate to form a one-dimensional or two-dimensional array in order to expand the dynamic measurement range. For each sensor, the thermally isolated membrane is formed by a process that includes a step of first depositing dielectric thin-film layers over the substrate and then performing a backside etching process on a bulk silicon with TMAH or KOH or carrying out a dry plasma etch until the bottom dielectric thin-film layer is exposed. Before backside etching the bulk silicon, rectangular openings are formed on the dielectric thin-film layers by applying a plasma etching to separate the area of heater and sensing elements from the rest of the membrane.

17 Claims, 6 Drawing Sheets

METHOD OF MANUFACTURING A FLOW RATE SENSOR

This Application is a Divisional Application and claims a Priority Filing Date of Mar. 11, 2004 benefited from a previously filed application Ser. No. 10/799,071 now abandoned filed previously by the inventors of this patent application.

BACKGROUND OF THE INVENTION

1. Field of the Invention

The present invention generally concerns mass flow sensors, and more particularly, concerns mass flow sensors made of micro-electromechanical systems (MEMS) approach, and methods of manufacturing such mass flow sensors.

2. Description of the Related Art

Conventional technologies of mass flow sensors are still limited by the difficulties of limited ranges of flow rate measurement and the requirement to maintain a high level of heating power. Specifically, the commercially available mass flow sensors are commonly made of transducers that include heaters and temperature sensors. The heater and temperature sensors are commonly provided with resistance wires such as platinum wires on a ceramic substrate. The stream of flow when passing over the mass flow sensor, carries away the heat from the heater thus causes temperature variations. The temperature variations and distributions depend on the mass flow rate, e.g., the velocity and the material properties of the flow. Thus the temperature of the heater and temperature distributions as that measured by the temperature sensors around the heaters are then applied to calculate the mass flow rate.

Over the past few years, the emergence of micro-electromechanical system (MEMS) technology has enabled the fabrication of mass flow sensors directly on silicon. The MEMS flow sensor can be provided with small size, low power, and high reliability at low cost. With low power dissipation, MEMS mass flow sensors can be used for measuring explosive gas mixtures over low explosion limits without risks.

Thermal mass flow sensors can be classified into three basic categories: anemometers, calorimetric flow sensors, and time-of-flight sensors. Jiang et al disclose a micromachined anemometer type flow sensor comprising of a single element, which is heated and a measurement of heat loss is performed. Please referred to "F. Jiang, Y. C. Tai, C. M. Ho, and W. J. Li, "A Micromachined Polysilicon Hot-Wire Anemometer," Digest Solid-State Sensors & Actuator Workshop, Hilton Head, S.C., pp. 264-267, 1994 for more details. This heat loss is dependent on the flow rate of the fluid. In general, this heat loss increases with the flow velocity, and the signal of an anemometer is proportional to the square root of the flow velocity. However, due to the variations and uncertainties of flow velocity, this measurement technique has limited accuracy when applied to measurements over a relative large range of flow rate measurement.

FIG. 1 shows a typical mass flow sensor device that generally includes a thin-film heating element and a pair of thin-film sensing resistors on a thin thermally-isolated membrane on the surface of a machined silicon substrate. As shown in FIG. 1, each pair of sensing resistors is symmetrically arranged with respect to the center heater at flow upstream and downstream, respectively. In the operation of the flow sensor, the heater element is energized to produce a temperature at the center that is considerably higher than ambient temperature. A temperature gradient thus is produced from the center heater to edges of the membrane area. The sensing resistors preferably made of materials, exhibiting a high resistance dependence on temperature, preferably a high thermal coefficient resistance (TCR) (e.g., 3000 ppm/° C.~8300 ppm/° C.). Accordingly, the resistances of the sensing resistors are caused to change in proportional to the temperature change in the area of the membrane containing the sensing resistors.

In the operation of flow sensor, a moving fluid carries away heat in the direction of flow and as a result changes the temperature distribution around the heater. The sensing resistors located at the upstream and downstream of the heater then measure the temperature difference between upstream and downstream locations. A Wheatstone bridge circuit, in which a pair of downstream and upstream sensing resistors comprises two of its four branches, fetches the output signal. The output signal, which is a measure of temperature difference, is proportional to the flow velocity initially until a high flow velocity is reached where the temperature difference saturates and then decreases at higher flow velocity. As shown in FIG. 1, a reference resistor on silicon substrate is generally used to monitor the ambient temperature. A Wheatstone bridge circuit consisting of the heater and the reference resistor can be formed to achieve constant-temperature control.

Hariadi et al disclose a time-of-flight flow sensor fabricated on Silicon-On-Insulator (SOI) wafers. The pulse is fed to the fluid by a heater and a temperature sensor located downstream detects its delay. Please refer to "I. Hariadi, H.-K. Trieu, W. Mokwa, H. Vogt, "Integrated Flow Sensor with Monocrystalline Silicon Membrane Operating in Thermal Time-of-Flight Mode," The 16th European Conference on Solid-State Transducers, Sep. 15-18, 2002, Prague, Czech Republic" for additional details. Measuring a flight time, the sensors provide data to calculate the velocity of the streaming fluid. However, the pulse is also deformed by the flow velocity profile and the pulse width is broadened at the same time by heat diffusion when it propagates down the stream. As a result, the pulse width tends to be too broad to be useful for measurement of slow flows and the flow rate measurement become inaccurate particularly for measuring flows below certain flow velocity.

The flow measurements apply the calorimetric flow sensors usually are implemented with a heater surrounded by temperature sensitive elements arranged symmetrically downstream and upstream. A moving fluid continuously carries away heat from its surroundings as the fluid is moving along the direction of flow thus changes the temperature distribution around the heater. The temperature difference between upstream and downstream is measured by the temperature sensitive elements. The output signal is commonly fetched using a Wheatstone bridge circuit, in which a pair of downstream and upstream sensing elements comprises two of its four branches. The output signal, which is a measure of temperature difference, is proportional to the flow velocity initially until a high flow velocity is reached where the temperature difference saturates and then decreases at higher flow velocity.

The heater is usually kept at a constant temperature above the ambient temperature. That is, the heater is operated in constant-temperature mode. The heater can also be operated in constant-power mode, in which the power supply to the heater is kept as constant. The ambient temperature is monitored by a reference resistor, which is made of the same material as the heater. A Wheatstone bridge circuit consisting of the heater and the reference resistor can be formed to achieve constant-temperature control.

U.S. Pat. No. 4,501,144 describes a calorimetric flow sensor, which was designed to measure either average gas velocity or mass flow rate through a flow channel. This mass flow sensor consisted of two thermally isolated silicon nitride membranes with a central heating, serpentine-resistor-element grid divided equally between the two bridges (or cantilevers). In addition, two identical thin-film serpentine resistor grids with relatively large temperature coefficients of resistance (TCRs) served as temperature sensors, placed symmetrically with respect to the heater on each microbridge. The sensor and heater grids were made of diffused or (temperature-sensitive) thin-film platinum or permalloy (Ni80Fe20), and were encapsulated in a 0.8~1.0 micron thick dielectric silicon nitride film, which comprised the suspended microbridges. Anisotropic etching of the silicon substrate (with KOH plus isopropyl alcohol) was used to create an air space pit below the microbridges that was preferably ~125 micron deep, precisely bounded on the sides by (111) silicon planes, and on the pit bottom and ends of the bridges by the (100) and other planes. The symmetry and effectiveness of the microbridge that is etched undercut was maximized by orienting the longitudinal axis of each bridge at an angle of 45° with respect to the <110> direction in the monocrystalline silicon substrate.

In a U.S. Pat. No. 6,550,324, Mayer et al. disclosed a mass flow sensor. As that shown in FIG. 1B, the flow sensor includes a heating element (4) arranged between two temperature sensors in order to measure the mass flow of a liquid or a gas. The mass flow is determined from the temperature difference of the temperature sensors (5, 6). For the pulse of reducing power consumptions, electric pulses are provided to operate the heating element (4). A further reduction of the power consumption is reached by means of a monitoring circuit (12), which switches the actual measuring section (11) on only if the signals from the temperature sensors (5, 6) fulfill a threshold condition. The pulsed power techniques as discussed above still face the difficulties that the range of measurements and accuracy are limited.

However, the above-mentioned techniques as discussed do not provide a resolution to the major concerns for mass flow sensors. Specifically, for those of ordinary skill in the art there is still a need to provide a mass flow sensor to reduce the heating power consumption and to expand the measurable flow rate range with sufficient accuracy.

SUMMARY OF THE INVENTION

According it is an object of the present invention to provide a MEMS mass flow sensor and MEMS flow sensor array with low heating power consumption and large measurable flow rate range. In addition, the present invention further discloses the methods for making the mass flow sensors.

According to the present invention, the reference resistor in a preferred embodiment is at least three-time larger than resistance of the heater. With increased resistance of the reference resistor, the power consumption by heater control circuit is cut down by 30%~50%.

According to the present invention, a requirement to symmetrically arrange the upstream and downstream sensing elements with respect to the heater is removed. For each pair of upstream and downstream sensing elements, the distance between the upstream sensing element and the heater can be used as a design parameter independent to the distance between the downstream sensing element and the heater. The distance between the downstream sensing element and the heater is itself also a design parameter. This allows for more design flexibility to achieve larger range of measurable flow rates.

In accordance with the present invention, a small resistor physically placed in an ambient temperature environment is connected in series to the downstream sensing element within a same branch of the bridge sensing circuit. Such a small resistor is utilized to offset fabrication variation, and its value depends on fabrication quality. With this novel configuration, the bridge sensing circuit is able to sense extremely slow flows, which in turns increases the measurable flow rate range.

Furthermore, the present invention discloses a novel configuration by integrating mass flow sensors as an array on a single MEMS chip. The array can be arranged either in a single row or in two-dimensional distribution. Each sensor can measure a specific flow range. With the integrated array configuration, the integrated MEMS mass flow sensors are enabled to achieve a maximum dynamic flow measurement range.

In a preferred embodiment, the mass flow sensor is manufactured by a process of carrying out a micro-machining process on an N or P-type silicon substrate with orientation <100>. This mass flow sensor comprises a central thin-film heater and a pair of thin-film heat sensing elements, and a thermally isolated membrane for supporting the heater and the sensors out of contact with the substrate base. The mass flow sensor is arranged for integration on a same silicon substrate to form a one-dimensional or two-dimensional array in order to expand the dynamic measurement range. For each sensor, the thermally isolated membrane is formed by a process that includes a step of first depositing dielectric thin-film layers over the substrate and then performing a backside etching process on a bulk silicon with TMAH or KOH or carrying out a dry plasma etch until the bottom dielectric thin-film layer is exposed. Before backside etching the bulk silicon, rectangular openings are formed on the dielectric thin-film layers by applying a plasma etching to separate the area of heater and sensing elements from the rest of the membrane.

These and other objects, features and advantages of the present invention will no doubt become apparent to those skilled in the art after reading the following detailed description of the preferred embodiments that are illustrated in the several accompanying drawings.

BRIEF DESCRIPTIONS OF THE DRAWINGS

The present invention can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENTS

Figure 1:
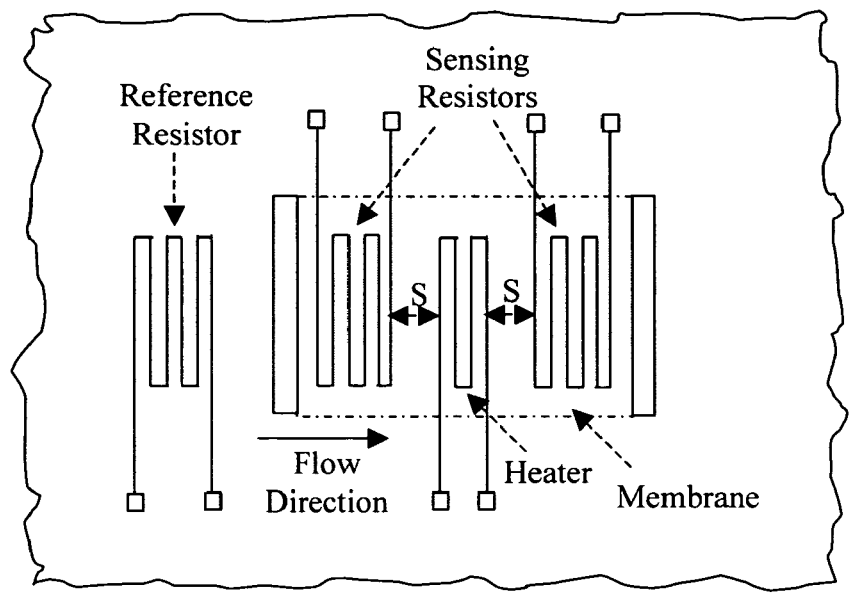
FIG. 1 is a top view illustration of a sensor topology according to the conventional techniques.
Figure 2:
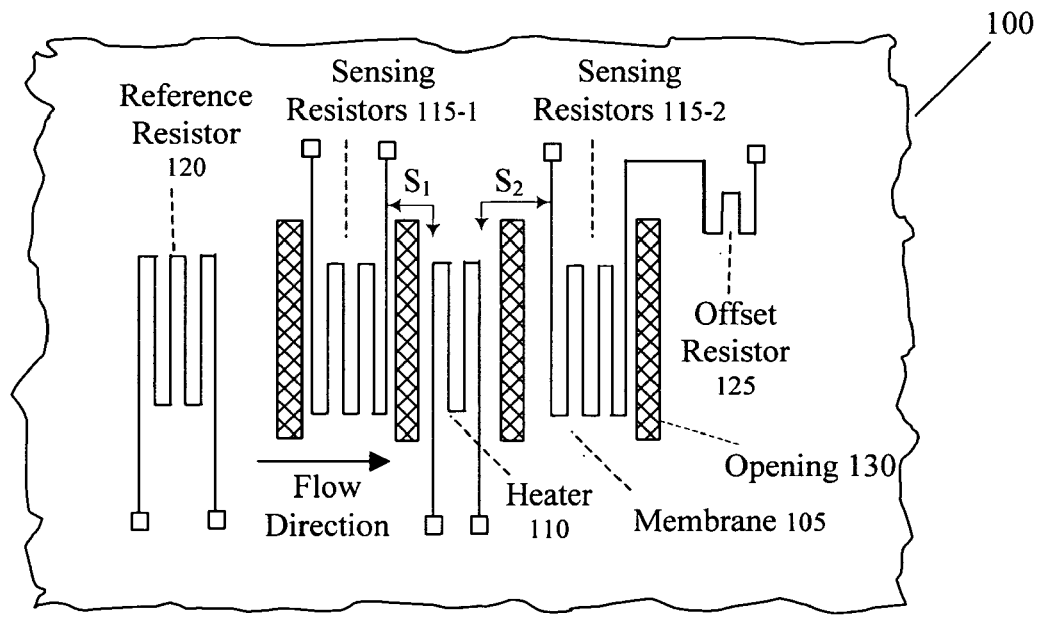
FIG. 2 is a top view illustration of a preferred sensor topology of the present invention.

FIG. 2 shows a top view of a flow rate sensor 100 as a preferred embodiment of the present sensor. The flow rate sensor 100 is supported on a membrane 105 and is manufactured by applying the MEMS manufacturing processes as illustrated below. The flow rate sensor includes a heater 110 and temperature sensing resistors 115-1 and 115-2 disposed on the upstream and downstream of the heater 110. The upstream and downstream sensing resistors may be symmetrical, i.e., resistors of equal resistance, or non-symmetrical resistors, i.e., resistors of different resistances. The upstream and downstream sensing resistors may be arranged to locate at either a symmetrical or non-symmetrical locations. The flow rate sensor further includes a reference resistor 120 that is provided to have a resistance that is at least three times greater than the resistance of the heater 110. The purpose to provide a reference resistor 120 that has greater resistance is to minimize the power dissipation over the reference resistor 120. With increased resistance of the reference resistor 120, the power consumption by the heater control circuit (not shown) is reduced by 30%~50%. When the resistance of the reference resistor 120 increases, the electric current flowing in the reference resistor branch decreases. The ratio between the electric currents of the heater and the reference resistor is inversely proportional to the ratio of their resistances. Hence, a larger ratio of resistance between the reference resistor 120 and the heater 110 reduces the power consumption of the mass flow rate sensor. Preferably, the ratio of resistances between the reference resistor 120 and the heater 110 is from 3:1 to 25:1.

As shown in FIG. 2, the upstream resistor 115-1 and the downstream resistor 115-2 may be arranged as symmetrical or non-symmetrical relative to the heater 110. The upstream resistor 115-1 and the downstream resistor 115-2 may be formed as non-symmetrical resistor, i.e., the resistance of the sensing resistor 115-1 may be different from resistor 115-2. Furthermore, these two resistors may be located at nonsymmetrical locations with respect to the heater 110. Represented by a combinational function F(S1,S2), the distance $S_1$ from the upstream sensing resistor 115-1 to the heater 110 can be used as a design parameter independent to the distance $S_2$ from the heater 110 to the downstream sensing resistor 115-2. The distance $S_2$ from the heater to the downstream sensing element is itself also a design parameter. This allows more design flexibility to achieve larger measurable flow rate range. Preferably, the ratio of $S_1/S_2$ is between 0.1 and 10. The distance between the upstream and downstream temperature sensing elements 115-1 and 115-2 is determined by the maximum flow velocity to effectively detect the flow rate by sensing the temperature variations. In general, the detectable maximum flow velocity is inversely proportional to the distance as that represented by (S1+S2). The distances as that defined by S1 and S2 are design parameters in the present invention and can be adjusted to optimize the response sensitivity of the flow rate sensor at different ranges of flow rate.

The flow sensor 100 further includes a small offset resistor 125 that is physically located on substrate or placed in an ambient temperature environment. The resistor 125 is in series connection to the downstream sensing resistor 115-2 (within the same branch of the bridge sensing circuit). The small resistor 125 is utilized to offset fabrication variation, and its value depends on fabrication quality. For example, if the maximum fabrication variation is 0.5%, the small resistor can be made to be 0.5% the resistance of downstream sensing element. With this new configuration, the total resistance of the downstream resistor branch, i.e., resistors 115-2 and 125, is always larger than that of the upstream resistor branch whether a flow moves through or not. Hence, the bridge sensing circuit is able to sense extremely slow flows, which in turn increases the measurable flow rate range. The ranges of resistance of the upstream and downstream resistor are preferably from a few hundred to a few thousand ohms. By precisely controlling the semiconductor fabrication processes using different materials for producing resistors of specified geometries allows the productions of these upstream and downstream resistors with precisely controlled resistances.

Figure 3:
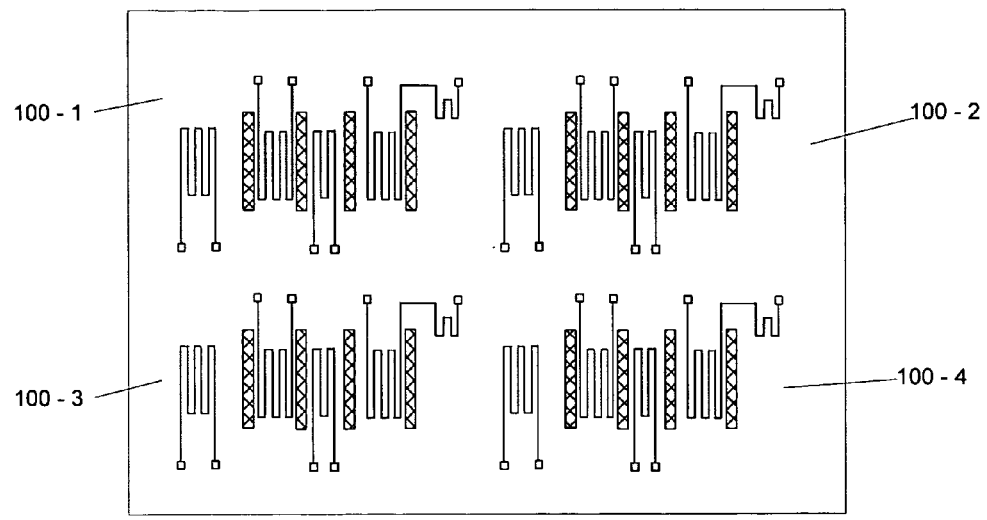
FIG. 3 is a top view illustration of a 2×2 sensor array of this invention.

FIG. 3 shows an alternate preferred embodiment by integrating multiple flow sensors as a sensor array in order to achieve expanded dynamic range of flow measurement. FIG. 3 shows a 2×2 sensor array that includes four flow sensors 100-1 to 100-4. The array can be further expanded to incorporate more sensors in a 1×N (N=1, 2, 3 . . . ) sensor array or N×N (N=1, 2, 3 . . . ) sensor array configuration. The array of flow sensors is preferably a combination of flow sensors, each of which is designed and optimized for a particular flow range whereas a combination of their individual measurable flow ranges results in a much larger integrated measurable dynamic flow range. For example, a sensor capable of measuring flows with velocities from 0.01 m/s to 1 m/s can be combined with a sensor capable of measuring flows with velocities from 0.9 m/s to 90 m/s to provide an array that includes two flow sensors with an expanded range of flow rate measurability. Therefore, an array of two flow sensors is capable of measuring flows with velocities from 0.01 m/s to 90 m/s by implementing a proper switch mechanism between two sensors. There are different kinds of electronic control circuits readily available that can be implemented as the sensor switch to switch the flow rate sensing operations between several sensors to expand the range of flow rate measurement.

In a preferred embodiment, a micro-machining process is carried out on an N or P-type silicon substrate to produce the mass flow sensor. It is preferable to carry out the micromachining process on the substrate along a <100> crystal orientation. The <100> crystal orientation is a preferable orientation when applying a KOH or TMAH wet etch process. It is well understood that the etch process rate along different directions is a competition between <100> and <111> crystal planes. For a KOH or TMAH wet etch process, the etch rate along the <100> crystal plane is much faster than that for <111> that results a more effective operation when the etch process is applied for producing a backside opening as will be further described below. This mass flow sensor comprises a central thin-film heater and a pair (or plural pairs) of thin-film heat sensing elements, and a thermally-isolated membrane supporting the heater and the sensors out of contact with the substrate base.

Figure 4:
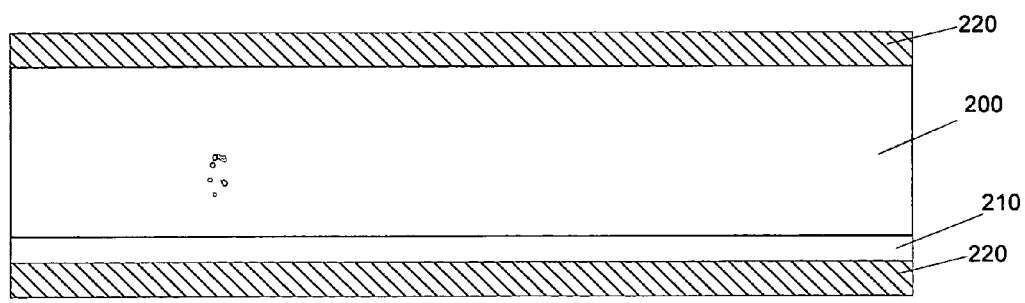
FIG. 4 is a side cross sectional view for a substrate for fabrication of the flow rate sensor of this invention.
Figure 5:
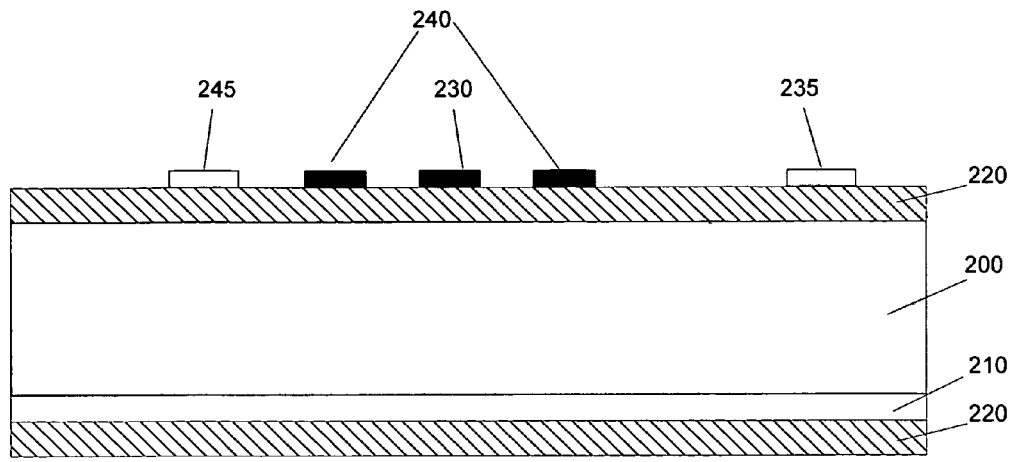
FIG. 5 is a cross sectional view of the silicon wafer with thermal oxide on backside and low stress silicon nitride film on both sides with patterned sensing elements, heater, reference resistor and offset resistor.
Figure 6:
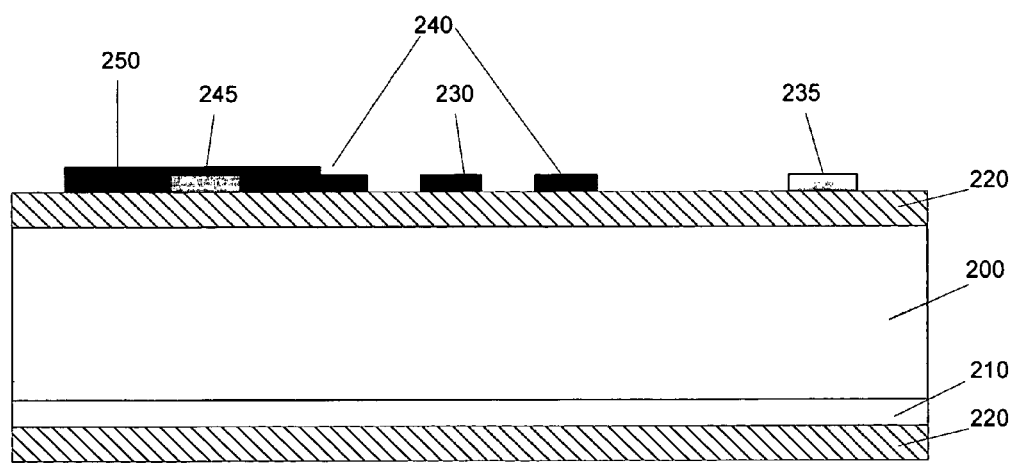
FIG. 6 is a side cross sectional view for showing the application of a second mask to deposit and form the leads and device pads.
Figure 7:
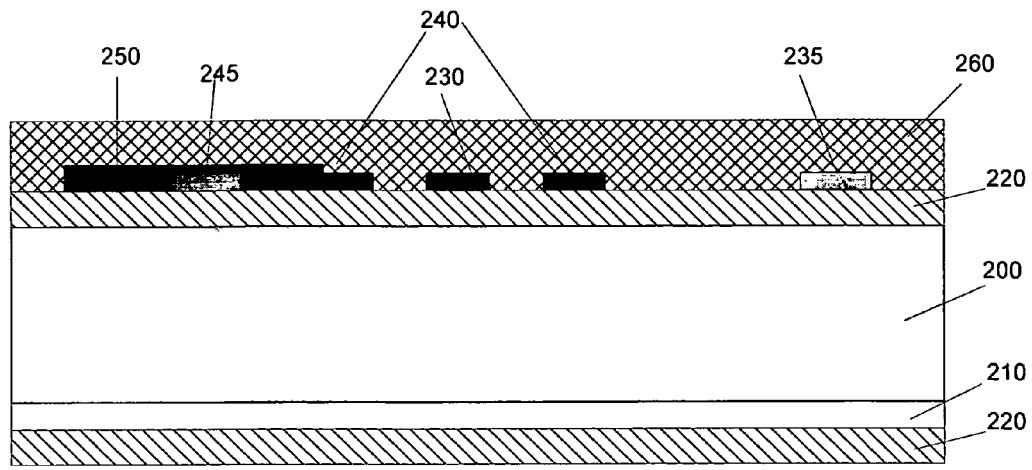
FIG. 7 is side cross sectional view for showing the formation of passivation layer.
Figure 8:
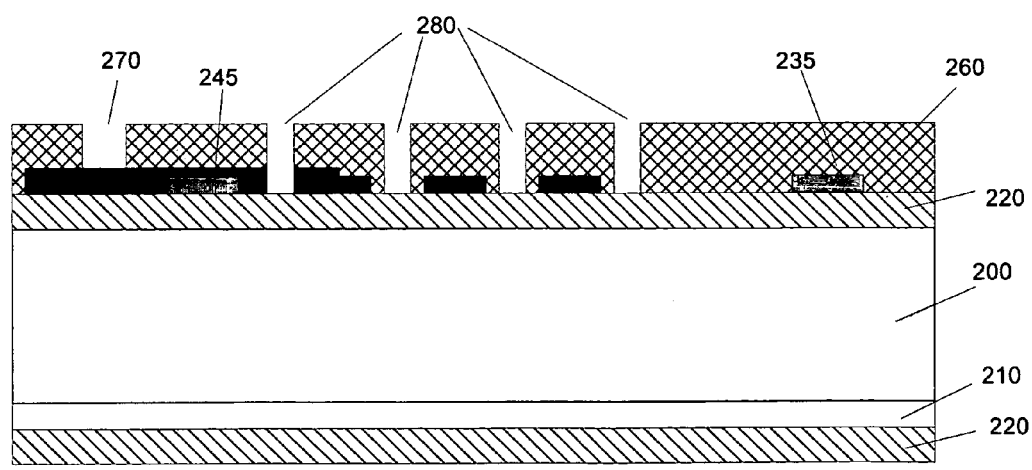
FIG. 8 is side cross sectional view for showing the application of a third mask to open the contact and thermal isolation openings.
Figure 9:
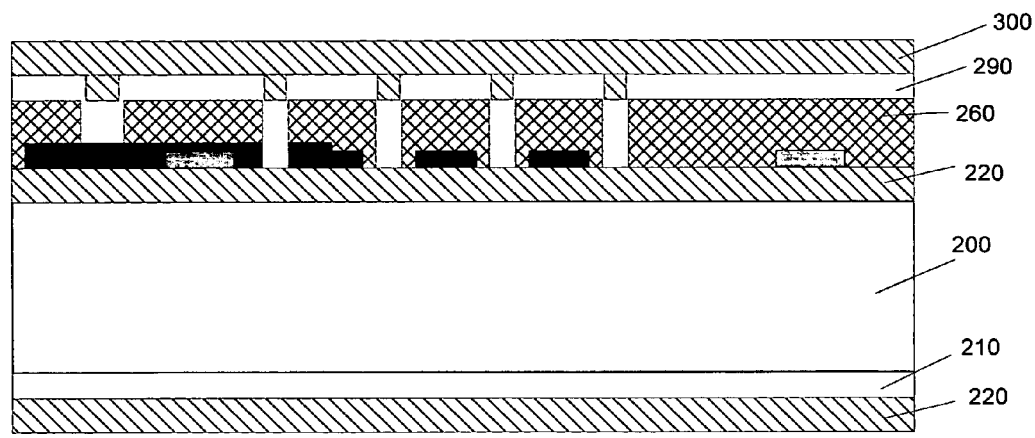
FIG. 9 is side cross sectional view for showing the formation of an oxide layer and a silicon nitride layer as an etch stop layer.

FIG. 4 shows a side cross sectional view of s silicon substrate. The substrate 200 can be either a N-type or P-type substrate. The process starts with the substrate 200 by forming a thermal oxide layer 210 with a thickness of about 1000 to 5000 Å on a backside then forming a nitride layer 220 with a thickness of about 3000 to 10000 Å on both sides of the substrate 200. As illustrated in FIG. 5, a first mask is applied to deposit and pattern the Cr/Pt micro-heater 230, i.e., heater 110 in FIG. 2, and sensors 240, i.e., sensing elements 115-1 and 115-2 in FIG. 2, with a thickness of Cr about 50 to 500 Å and Pt from 800 to 3000 Å. Further deposited are Cr/Pt offset resistor 235, i.e., offset resistor 125 in FIG. 2, and reference sensor 245, i.e., reference resistor 120 in FIG. 2, with a thickness of Cr about 50 to 500 Å and Pt from 800 to 3000 Å. FIG. 6 shows the application of a second mask to deposit and form the leads and device pads 250 having a thickness of Cr ranging from 50 to 500 Å and Au from about 800 to 3000 Å. In FIG. 7, a passivation layer is formed by depositing a silicon nitride layer 260 having a thickness about 2000 to 5000 Å, and as shown in FIG. 8 a third mask is applied to open the contact 270 and heat insulation 280, i.e., opening 130 in FIG. 2. Such opening will also serve as the isolation and boundary layer for the flow field so that there will be no abrupt thermal field in the measurement region of the sensors. In FIG. 9, an oxide layer 290 with a thickness of about 2000 to 8000 Å is formed covering the top surface. A silicon nitride layer 300 having a thickness about 1000 to 8000 Å is formed on top of the silicon oxide layer 290 by applying a chemical vapor deposition as etch-stop protection layer for a silicon bulk etching. The backside silicon nitride layer 220 is then removed via plasma etch. The silicon bulk etching process by using TMAH of KOH or plasma etching to etch off the bulk silicon through an opening on the thermal oxide layer 210 as will be further described below.

Figure 10:
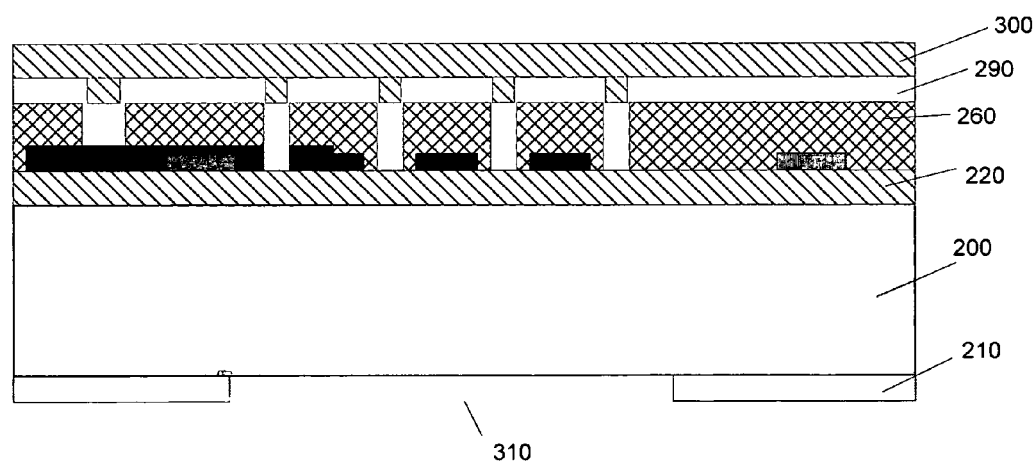
FIG. 10 is side cross sectional view for showing the patterning of a backside to open an etch window.
Figure 11:
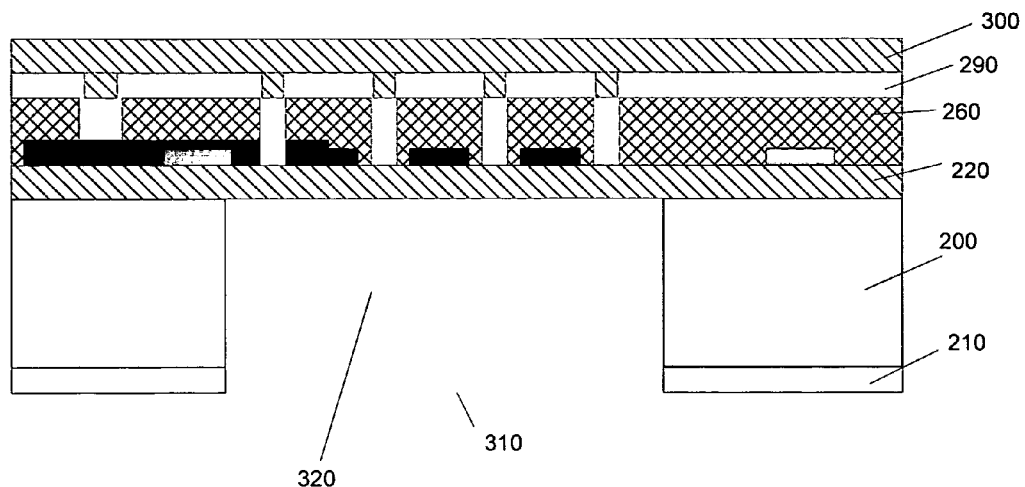
FIG. 11 is side cross sectional view for showing the application of a bulk etching by TMAH, KOH or plasma etch from the backside to form a cavity underneath the membrane.
Figure 12:
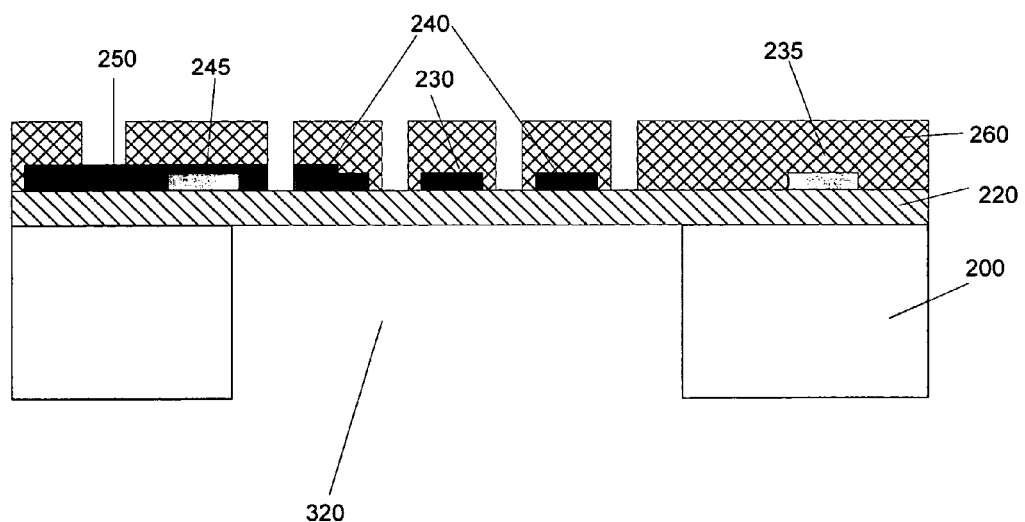
FIG. 12 is side cross sectional view for showing the removal of the oxide and the silicon nitride layer to complete the processes for making the flow rate sensor.

In FIG. 10, a fourth mask is used to pattern the backside of the thermal oxide layer 210 to open an etch window 310 using wet chemical etch such as hydrofluoric acid etch to apply a KOH or TMAH or plasma etch through this etch window 310. A bulk wet-etch by applying KOH or TMAH or plasma etching process is shown in FIG. 11. The etch process removes the bulk silicon substrate and open a cavity 320 in the substrate 200. In FIG. 11, the etch-stop protection layer 300 is etched and removed by applying a reactive-ion etch. Then the bottom oxide layer 210 and the top oxide layer 290 are removed by etching oxide on both sides in Hydrofluoric (HF) contained acids or PAD etchant to produce the device as shown in FIG. 12.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A method for manufacturing a flow rate sensor comprising:
   providing a silicon substrate and forming a silicon oxide layer on a bottom surface as a back surface of said silicon substrate followed by applying a low pressure chemical vapor deposition (LPCVD) process to deposit a silicon nitride layer on top of said silicon substrate as a front surface opposite the back surface;
   forming temperature sensing elements and a heater on top of said silicon nitride layer;
   covering said front surface with a passivation layer and depositing wet etch protection layers on top of said passivation layer on said front surface of said substrate and bulk-etching said silicon substrate from said back surface opposite said sensing elements with a wet anisotropic etch for exposing said silicon nitride layer as a thermally isolated membrane supporting said temperature sensing elements and said heater on top of said silicon nitride layer; and
   removing said wet etch protection layers from said front surface and said silicon oxide layer from said back surface whereby said flow rate sensor is supported on a bare silicon substrate.

2. The method of claim 1 wherein:
   said step of forming said temperature sensing elements further comprising a step of forming an upstream sensing element and a downstream sensing element on an upstream location and a downstream location with a symmetrical configuration relative to said heater disposed on top of said silicon nitride layer as said thermally-isolated membrane.

3. The method of claim 1 wherein:
   said step of forming said temperature sensing elements further comprising a step of forming an upstream sensing element and a downstream sensing element on an upstream location and a downstream location with a non-symmetrical configuration relative to said heater disposed on top of said silicon nitride layer as said thermally-isolated membrane.

4. The method of claim 1 further comprising wherein:
   disposing an offset resistor on said substrate at a downstream location relative to said heater for compensating a downstream temperature sensing element,
   said step of forming said temperature sensing element further comprising a step of forming said temperature sensing element comprising a Pt/Cr resistor.

5. The method of claim 4 further comprising:
   covering said sensing element and said heater with a passivation layer; and
   opening a separating trench on said passivation layer between said heater and said temperature sensing element for thermally isolating said heater from said temperature sensing element.

6. The method of claim 4 wherein:
   said step of forming said temperature sensing element further comprising a step of forming an upstream sensing element and a downstream element on an upstream location and a downstream location relative to said heater on said thermally-isolated membrane.

7. The method of claim 4 wherein:
   said step of forming said temperature sensing element further comprising a step of forming an upstream sensing element and a downstream element on an upstream location and a downstream location with a symmetrical configuration relative to said heater on said thermally-isolated membrane.

8. The method of claim 4 wherein:
   said step of forming said temperature sensing element further comprising a step of forming an upstream sensing element and a downstream element on an upstream location and a downstream location with a non-symmetrical configuration relative to said heater on said thermally-isolated membrane.

9. The method of claim 1 wherein further comprising:
said step of forming said protection layer further comprising a step of applying a plasma enhanced chemical vapor deposition (PECVD) process for depositing a silicon oxide layer and a silicon nitride layer covering said passivation layer on said front surface for protecting the passivation layer in said process of bulk-etching said silicon substrate by applying said anisotropic wet etch process,
disposing a heater on said thermally isolated membrane.

10. The method of claim 4 further comprising 1 wherein:
said step of removing said protection layer further comprising a step of applying a dry plasma etching process to remove said PECVD nitride layer; and
said step of removing said silicon oxide layer from the front side surface and said silicon oxide layer on said back side surface further comprising a step of applying a wet etching process to expose the passivation layer on the front side surface and the back side surface as a bare silicon surface,
covering said sensing element and said heater with a passivation layer.

11. The method of claim 1 further comprising:
disposing a reference resistor on said substrate with a resistance ranging from three to twenty-five times a resistance of said sensing element.

12. The method of claim 1 further comprising:
disposing an offset resistor on said substrate at a downstream location relative to said heater for compensating a downstream temperature sensing element.

13. The method of claim 1 wherein:
said step of depositing said wet etch protection layers on said front surface of said substrate further comprising a step of applying a plasma enhanced chemical vapor deposition (PECVD) process for depositing a protection PECVD oxide layer and a protection PECVD nitride layer covering said passivation layer on said front surface for protecting said passivation layer in said process of bulk-etching said silicon substrate.

14. The method of claim 1 wherein:
said step of removing said wet etch protection layers from said front surface further comprising a step of applying a dry plasma etching process to remove said protection PECVD nitride layer.

15. The method of claim 1 wherein:
said step of removing said thermal silicon oxide layer from said back surface further comprising a step of applying a wet etching process to remove said protection PECVD oxide layer from said front surface and said oxide layer from said back surface thus exposing the silicon substrate on said back surface constituting said bare silicon substrate.

16. A method for manufacturing a flow rate sensor comprising:
providing a silicon substrate and forming a silicon oxide layer on a bottom surface as a back surface of said silicon substrate followed by applying a low pressure chemical vapor deposition (LPCVD) process to deposit a silicon nitride layer on top of said silicon substrate as a front surface opposite the back surface;
forming temperature sensing elements and a heater on top of said silicon nitride layer followed by covering said front surface with a passivation layer; and
opening separating trenches on said passivation layer between said heater and said temperature sensing elements for thermally isolating said heater from said temperature sensing elements.

17. The method of claim 16 wherein:
the step of forming the temperature sensing elements and the heater on top of said silicon nitride layer further forming a reference resistor on top of said silicon nitride layer on said front surface of said silicon substrate with a resistance ranging from three to twenty-five times of said heater.

* * * * *